C. D. HASKINS.
MAXIMUM INDICATOR FOR MEASURING INSTRUMENTS.
APPLICATION FILED JUNE 22, 1906.

963,147.

Patented July 5, 1910.

Witnesses:
Burchard V. Kelley
Helen Alford

Inventor:
Caryl D. Haskins.
by Albert G. Davis
Atty.

UNITED STATES PATENT OFFICE.

CARYL D. HASKINS, OF SCHENECTADY, NEW YORK, ASSIGNOR TO GENERAL ELECTRIC COMPANY, A CORPORATION OF NEW YORK.

MAXIMUM-INDICATOR FOR MEASURING INSTRUMENTS.

963,147.        Specification of Letters Patent.        Patented July 5, 1910.

Application filed June 22, 1906. Serial No. 322,844.

*To all whom it may concern:*

Be it known that I, CARYL D. HASKINS, a citizen of the United States, residing at Schenectady, county of Schenectady, State of New York, have invented certain new and useful Improvements in Maximum-Indicators for Measuring Instruments, of which the following is a specification.

This invention relates to measuring instruments, and has for its object the provision of a device of this character in which the range through which the movable element of the instrument has been carried during a specified period may be indicated in a simple and accurate manner.

My invention relates more specifically to electrical measuring instruments for making registrations progressively at certain fixed amounts of energy as they are attained on the circuit in connection with which the instrument is used.

My invention is intended to be used in connection with various types of instruments, the feature of the invention being the recording of the limits of movement.

One of the objects of my invention, therefore, is to provide an instrument which will accurately record the maximum load or energy used in an electrical circuit at any one time between any two observations, and I accomplish this result by having a series of indicators which are arranged to drop or otherwise assume a definite position as the pointer of the instrument reaches predetermined positions. The indicators or tabs are mounted to move freely on a pivot concentric with the pointer and are marked to correspond with the markings on the scale of the instrument. The tabs are arranged so that they successively come into a position in which they will fall by gravity, so as to indicate that the pointer has reached a position corresponding to the indications on these tabs.

Figure 1:
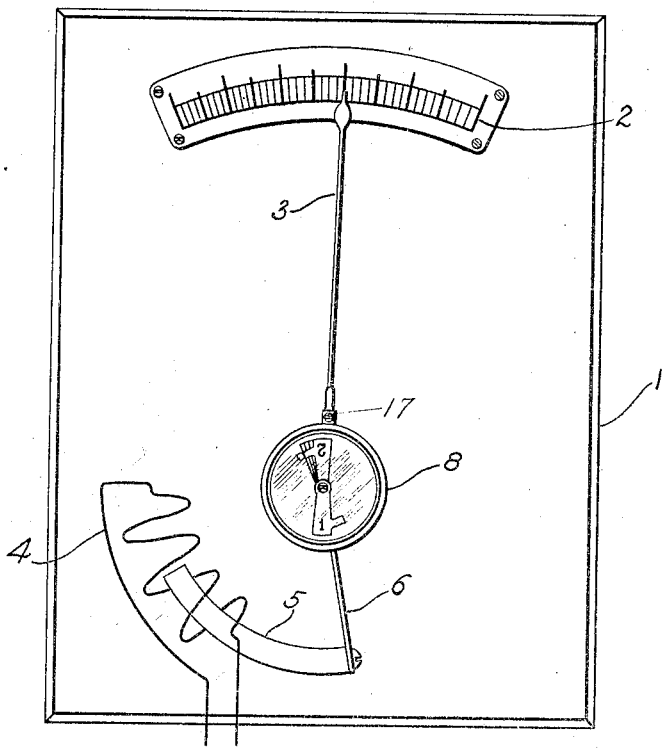
Figure 2:
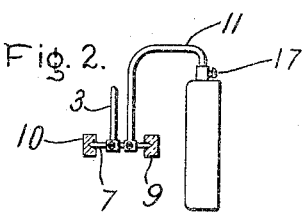
Figure 3:
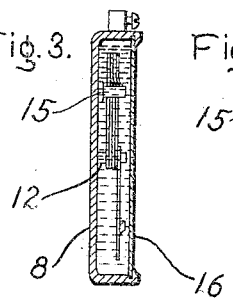
Figure 4:
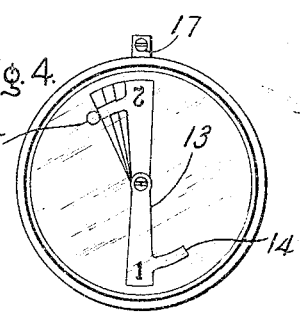

In the accompanying drawings, in which I have illustrated one form of my invention, Figure 1 is an elevation of an instrument embodying my improvements; Fig. 2 is a detail of the jewel bearings of an instrument showing my indicator attached to the pointer; Fig. 3 is a section through the indicator case; and Fig. 4 is an elevation of the same.

Referring to the drawings, 1 represents the case of an instrument having a scale 2 and a movable pointer 3. While my invention may be applied to any form of instrument having a movable element, I shall show it—for purposes of illustration—in connection with an Edison type of ammeter, having a coil 4 and a core 5 supported by an arm 6 adapted to swing about the pivot 7 and move the pointer 3. Mounted concentrically with the pointer 3 is a cup-shaped vessel 8, preferably of metal. This I have shown as being connected with the pivot 7, having jeweled bearings 9 and 10, by means of a U-shaped rod 11 bent so as to bring the center of the vessel in line with the pivot. At the center of this cup is an exceedingly fine fixed shaft 12 rigidly secured at right angles to the base. Mounted on this shaft to move freely are a series of slips or tabs 13 of very thin sheet metal, such as aluminum, which are very carefully flattened. These tabs each have a number or other indication thereon so as to constitute an indicator. On the free end of each tab is a projection 14 adapted to abut against a pin 15 secured in the base of the cup. The lengths of the projections on these tabs vary, so that successive tabs will be in advance of each other. The case is then covered with a glass cover or window 16, which is preferably spun in so as to make a tight joint. The case is then filled with a transparent oil of medium viscosity. This case may be secured to the arm 11 by means of a set screw 17.

The operation of my device will be clearly understood from the above description.

When a load is placed on the instrument and the pointer 3 is moved over its scale the case 8 is rotated with the pointer, and the pin 15 carries the indicators, which are set one slightly in advance of its neighbor, to a vertical position above the shaft 12. As each indicator passes the vertical position it starts to fall, the oil causing the movement to be somewhat retarded. As shown in Fig. 1, the tab marked 1 has fallen and tab 2 is just about to fall. Because of the close contact between the adjacent tabs, each tab as it falls drags itself away from its neighbor very slowly, but after it leaves the adjacent tab it moves more rapidly. If, therefore, before it pulls away from its neighbor the pointer of the instrument should return to a point below the required indication, the tab would move back to its original position against the stop pin 15. By loosening the set screw 17, the case 8 may be removed and the tabs returned to their original position. It will, therefore, be seen that I have produced a device in which a minimum of power is required for its operation, thus reducing the necessity for a high torque and doing away with the difficulties in balancing the moving element which have been inherent in the instruments heretofore devised. My device is capable of use, therefore, in connection with low torque instruments, such as wattmeters, as well as other instruments having a higher torque.

It should be understood, of course, that many modifications and equivalent devices will suggest themselves to those skilled in the art, which, while different in construction, will not depart from the spirit of my invention, the scope of which is set forth in the claims annexed hereto.

What I claim as new and desire to secure by Letters Patent of the United States, is,—

1. The combination with a measuring instrument having a movable element, of means for indicating the maximum movement of said element comprising a plurality of indicators slidable over one another with a retarded movement due to frictional engagement and arranged to be moved successively by said element throughout a predetermined range and thereafter movable independently of said element.

2. The combination with a measuring instrument having a movable element, of means for indicating the maximum movement of said element comprising a plurality of indicators in frictional engagement with one another, and means whereby each indicator is successively moved with said element to a predetermined point and then automatically moved away from said element to a fixed point with a retarded movement due to sliding over the remaining adjacent indicator.

3. The combination with a measuring instrument having a movable element, of means for indicating the maximum movement of said element comprising a plurality of flat indicators mounted side by side and in frictional engagement with one another on a common pivot concentric with the pivot of said element, and a casing for said indicators detachably connected to said element.

4. The combination with a measuring instrument having a movable element, of means for indicating the maximum movement of said element comprising a plurality of flat indicators mounted side by side and in frictional engagement with one another on a common pivot concentric with the pivot of said element, and a casing for said indicators containing a fluid for retarding the relative movement thereof.

5. The combination with a measuring instrument having a movable element, of means for indicating the maximum movement of said element comprising a plurality of indicators arranged in frictional engagement to have a retarded movement relative to one another, and means whereby said indicators are successively moved by said element to a predetermined position as the latter assumes successive positions.

6. The combination with a measuring instrument having a movable element, of means for indicating the maximum movement of said element comprising a plurality of indicators mounted on a common pivot side by side and in frictional engagement with one another, and means whereby said indicators are successively moved by said element to a predetermined position as the element successively assumes different predetermined positions.

7. The combination with a measuring instrument having a movable element, of means for indicating the maximum movement of said element comprising a plurality of relatively movable indicators frictionally engaging one another to retard the relative movement thereof, and means whereby said indicators are successively moved by said element to a position beyond the control of said element when the latter assumes successive positions.

8. The combination with a measuring instrument having a movable element, of means for indicating the maximum movement of said element comprising a plurality of indicators each arranged to be positively moved by said element throughout a predetermined range and thereafter movable independently of said element, said indicators being mounted in frictional engagement with one another whereby the movement of each indicator is retarded by friction with the next remaining adjacent indicator.

9. The combination with a measuring instrument having a pivoted movable element, of means for indicating the maximum movement of said element comprising a plurality of freely-moving indicators pivoted concentrically with said element and means whereby said indicators are successively moved by said element to a predetermined position beyond the control of said element.

10. The combination with a measuring instrument having a pivoted movable element, of means for indicating the maximum movement of said element comprising a casing having a retarding fluid therein, a plurality of indicators freely pivoted therein concentrically with said element, and means whereby said indicators are moved by said element to a predetermined position from which said indicators are free to move in response to gravity through the retarding fluid to a fixed position.

In witness whereof, I have hereunto set my hand this 21st day of June, 1906.

CARYL D. HASKINS.

Witnesses:
BENJAMIN B. HULL,
HELEN ORFORD.